(12) United States Patent
Kanamaru et al.

(10) Patent No.: US 6,278,570 B1
(45) Date of Patent: Aug. 21, 2001

(54) METHOD AND APPARATUS FOR MOVING A HEAD ARM ASSEMBLY TO A LANDING ZONE IN A DISK DRIVE STORAGE DEVICE

(75) Inventors: Masayuki Kanamaru, Fujisawa; Hiroyuki Akiyama, Kawasaki; Akira Morita, Zama; Shingo Tsuda, Yokohama, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/189,079

(22) Filed: Nov. 9, 1998

(30) Foreign Application Priority Data

Nov. 28, 1997 (JP) .................................................... 9-328244

(51) Int. Cl.[7] .................................................... G11B 21/02
(52) U.S. Cl. ...................... 360/75; 360/254.2; 360/256.2
(58) Field of Search ........................... 360/69, 75, 254.2, 360/256.3, 256.2

(56) References Cited

U.S. PATENT DOCUMENTS

| | | | | |
|---|---|---|---|---|
| 4,987,502 | * | 1/1991 | Freeze | 360/75 |
| 5,241,438 | * | 8/1993 | Matsushima | 360/256.3 |
| 5,303,100 | * | 4/1994 | Nakayama et al. | 360/266.2 |
| 5,446,606 | * | 8/1995 | Brunner et al. | 360/75 |
| 5,568,333 | * | 10/1996 | Bang | 360/256.3 |
| 5,719,720 | * | 2/1998 | Lee | 360/71 |
| 5,729,399 | * | 3/1998 | Albrecht et al. | 360/75 |
| 6,172,855 | * | 1/2001 | Kim | 360/256 |

FOREIGN PATENT DOCUMENTS

| | | | | |
|---|---|---|---|---|
| 02073581A | * | 3/1990 | (JP) | G11B/21/12 |
| 3132980 | | 6/1991 | (JP) | G11B/21/12 |
| 9167305A2 | | 6/1997 | (JP) | G11B/5/012 |
| 411167781A | * | 6/1999 | (JP) | G11B/21/12 |
| 2000048506A | * | 2/2000 | (JP) | G11B/21/12 |

* cited by examiner

Primary Examiner—David Hudspeth
Assistant Examiner—Dan I. Davidson
(74) Attorney, Agent, or Firm—Noreen A. Krall; Robert B. Martin

(57) ABSTRACT

The present invention provides a method and apparatus for moving a head arm assembly to a landing zone in a disk drive storage device. In disk drive according to the present invention, a control means responds to termination of a read/write operation by applying a drive current for moving an actuator arm toward an actuator lock, and then continuously applies the drive current to the actuating means to maintain an engagement of the actuator arm with the actuator lock stopped at a predetermined position, after the termination of read/write operation, and then stops a rotation of said rotating data recording disk.

3 Claims, 13 Drawing Sheets

METHOD AND APPARATUS FOR MOVING A HEAD ARM ASSEMBLY TO A LANDING ZONE IN A DISK DRIVE STORAGE DEVICE

BACKGROUN OF THE INVENTION

1. Field of the Invention

The present invention relates to a hard disk drive storage device and more particularly to a method for controlling the hard disk drive device to improve the durability of a surface of a landing zone of a data recording hard disk in the disk drive storage device when a head/slider assembly of an actuator arm lands on the surface of the landing zone.

2. Description of Related Art

In the hard disk drive device, a contact start/stop (CSS) scheme causes the head/slider assembly to rest on the surface of the landing zone of the data recording hard disk when a read/write operation is terminated. In the CSS scheme, the head/slider assembly is slidably moved on the surface of the data recording hard disk, so that the surface of the data recording hard disk is worn. To decrease the wear of the surface of the data recording hard disk, fine grooves referred to as mechanical texture are formed in a circumference direction of the data recording hard disk. The FIG. 1 shows the mechanical texture 1 formed on the data recording hard disk 2. The surface of the data recording hard disk is divided into the landing zone 3 and a data recording zone 4. The mechanical texture 1 is formed on the landing zone 3 and data recording zone 4, since it is difficult to define a clear boundary 5 between the landing zone 3 and the data recording zone 4, as shown in the FIG. 2(A). Defining a clear boundary is difficult because the mechanical process for forming the mechanical texture 1, i.e. the fine grooves, is not precisely controlled, so that a transition zone 6 as shown in the FIG. 2(B) is necessarily formed in the data recording zone 4, and thus the area of the data recording zone 4 reserved for data is decreased.

The FIG. 3 shows a typical structure of the hard disk drive device. The data recording hard disk 2 is rotated by a spindle motor (not shown). An actuator arm 7 is pivotally mounted on a pivot point 12, and is rotated around the pivot point 12 by a voice coil motor (VCM) 9, so that a head/slider assembly 8 is moved along a radial direction of the data recording hard disk 2. An inner actuator lock 11 is provided to stop the movement of the head/slider assembly 8 at the landing zone 3. The detail structure of the inner actuator lock 11 is shown in the FIG. 6, wherein the inner actuator lock 11 is moved between a first position, i.e. an inner most position or a left side position in the FIG. 6, and a second position, i.e. an outer most position or a right side position in the FIG. 6, as described latter to absorb any shock when the actuator arm 7 engages with the inner actuator lock 11. An outer actuator lock 10 is provided to stop the movement of the head/slider assembly 8 at an outer most data recording track in the data recording zone 4. The outer actuator lock 10 is also moved between a first position and a second position, as in the case of the inner actuator lock 11. Referring back to FIG. 3, one end of a flexible cable 16 is connected to the actuator arm 7 to supply the data signals to the read/write head and receives the data signals from the read/write head. The other end of the flexible cable 16 is mounted to a frame 28 of the hard disk drive device. In the hard disk drive device using the data recording hard disk with the mechanical texture, it is required to oscillatingly move the head/slider assembly 8 in a radial direction 13 within the landing zone 3 to minimize the wear and the damage of the mechanical texture 1, i.e. the fine grooves, when the head/slider assembly 8 lands on or takes off the surface of the landing zone 3.

A flying height of the head/slider assembly 8 above the surface of the data recording hard disk 2 has been decreased to increase a data recording capacity of the hard disk 2. A laser texture has been used in place of the mechanical texture to improve the durability of the surface of the landing zone 3 and to use a zone texture technology in which the texture is formed only in the landing zone, when the low flying height of the head/slider assembly 8 is used. The laser texture realizes the low flying height and the large data capacity since it is possible to precisely control a height, a density and a roughness of the laser texture. FIGS. 4A and 4B show the laser texture 14 formed in the landing zone 3. The laser texture 14 is constituted by a plurality of discrete bumps 15 formed by a laser process. The bumps 15 are regularly arranged, and the height and the diameter of the bumps 15 and the space between the bumps 15 are precisely controlled. The height of the bump 15 is 10 nm through 50 nm, preferably 20 nm through 30 nm, the width or diameter of the bump 15 is 5 nm through 30 nm, preferably 10 nm. The space between the adjacent bumps is 20 nm through 200 nm, preferably 50 nm through 100 nm.

In has been noted, however, that the movement of the head/slider assembly 8 in the radial direction 13 of the hard disk 2 during the landing operation of the head/slider assembly 8 remarkably damages the bumps 15 of the laser texture 14 of the landing zone 3 and thus decreases the durability of the surface of the landing zone 3. Correspondingly, the number of times of the CSS operation is decreased and the life cycle of the hard disk drive device is shortened. More particularly, the following problems have been found with the above described approach: (1) if the actuator arm 7 supporting the head/slider assembly 8 is oscillatingly moved between the first position and the second position of the inner actuator lock 11 during the landing operation as performed for the hard disk with the mechanical texture 1, the laser dimples are damaged by the head/slider assembly 8; (2) if the actuator arm 7 supporting the head/slider assembly 8 is moved between the first position and the second position of the inner actuator lock 11 during the landing operation due to an application of a leakage current to the VCM 9 which is induced by a counterelectromotive force of a spindle motor coil, the laser dimples are damaged by the head/slider assembly 8; (3) if the actuator arm 7 supporting the head/slider assembly 8 is moved between the first position and the second position of the inner actuator lock 11 during the landing operation due to a bias force applied by the flexible cable 16, the laser dimples are damaged by the head/slider assembly 8; and (4) if the actuator arm 7 supporting the head/slider assembly 8 is moved between the first position and the second position of the inner actuator lock 11 during the landing operation due to a restore force of the actuator lock 11, the laser bumps are damaged by the head/slider assembly 8.

In summary, it has been found that the undesired damage of the laser bumps is caused by the fact that the head/slider assembly 8 is landed on the landing zone 3 before that the inner actuator lock 11 engaged with the actuator arm 7 is not fixed at the first or second position of the inner actuator lock 11. Accordingly, it can be seen that there is a need in the art to provide an improved method and apparatus for moving a head arm assembly to the landing zone in a disk drive storage device.

SUMMARY OF THE INVENTION

To overcome the shortcomings of the prior art described above, it is the object of the present invention is to provide a method and apparatus for moving a head arm assembly to a landing zone in a disk drive storage device.

It is a further object of the present invention to provide a method and apparatus for landing the head arm assembly in the landing zone that minimizes damage to the bumps of laser texture in the landing zone of a rotating data storage disk.

Briefly stated, a disk drive storage device that achieves the above described objects in accordance with the present invention comprises: a rotating data recording disk having a data recording zone and a landing zone; a head/slider assembly flying above the rotating data recording disk; an actuator arm supporting said head/slider assembly; an actuating means for moving the actuator arm to move the head/slider assembly across the data recording zone and the landing zone along a radial direction of the rotating data recording disk; an actuator lock for stopping a movement of the actuator arm to position the head/slider assembly above the landing zone; and a control means for responding to a termination of a read/write operation to apply a drive current for moving the actuator arm toward the actuator lock; wherein the control means continuously applies the drive current to the actuating means to maintain an engagement of the actuator arm with the actuator lock stopped at a predetermined position, after the termination of read/write operation, and stops a rotation of the rotating data recording disk.

In the disk drive storage device, a plurality of discrete bumps are arranged in the landing zone of the disk. The landing zone is formed at an inner position on the rotating data recording disk and the data recording zone surrounds the landing zone. The actuator lock is capable of reciprocally moved between a first position at a center side of the rotating data recording disk and a second position at a peripheral side of the rotating data recording disk. The first and second positions are so defined as to position the head/slider assembly above the landing zone at the time of the engagement of the actuator arm and the actuator lock, and the control means continuously applies the drive current to the actuating means to maintain the engagement of the actuator arm with the actuator lock at the first position after the termination of read/write operation, and stops a rotation of the rotating data recording disk.

The control means responsive to the termination of the read/write operation to apply a drive current of a first value to the actuating means for moving the actuator arm toward the actuator lock, and decreases the first value of the drive current applied to the actuating means to a second value which is sufficient to maintain the engagement of the actuator arm with the actuator lock at the first position.

The control means decreases the value of drive current from the first value to the second value when the control means detects a lapse of a predetermined time period from a start of the application of the drive current of the first value. The predetermined time period is selected to a time period during which the actuator arm with a head of the head/slider assembly being positioned at any data recording track is moved to engage with the actuator lock and both the actuator arm and actuator lock are stopped at the first position.

The control means decreases the value of drive current from the first value to the second value when the control means detects a lapse of a predetermined time period from the passage of the head of the head/slider assembly through an inner most data recording track on the rotating data recording disk. Further, the predetermined time period is selected to a time period during which the actuator arm with the head of the head/slider assembly passing through the inner most data recording track is moved to engage with the actuator lock and both the actuator arm and actuator lock are stopped at the first position.

In another embodiment of the present invention, a disk drive device comprises a rotating data recording disk having a landing zone and a data recording zone surrounding the landing zone; a head/slider assembly flying above the rotating data recording disk; an actuator arm supporting the a head/slider assembly; an actuating means for moving the actuator arm to move the head/slider assembly across the data recording zone and the landing zone along a radial direction of the rotating data recording disk; an actuator lock capable of reciprocally moved between a first position at a center side of the rotating data recording disk and a second position at a peripheral side of the rotating data recording disk and biased toward the second position, the first and second positions being so defined as to position the head/slider assembly above the landing zone at the time of the engagement of the actuator arm and the actuator lock; and a control means for responding to a termination of a read/write operation to apply a drive current for moving the actuator arm toward to the actuator lock; wherein the control means responsive to the termination of the read/write operation applies the drive current to the actuating means to move the actuator arm until the actuator arm is stopped by the actuator lock at the first position and stops the application of the drive current to cause the actuator lock engaged with the actuator arm to return to the second position when the control means detects that the actuator lock reaches the first position, and stops a rotation of the rotating data recording disk.

In the disk drive storage device a plurality of discrete bumps are arranged in the landing zone on the rotating data recording disk.

The control means stops the application of the drive current when the control means detects a lapse of a predetermined time period from a start of the application of the drive current, and the predetermined time period is selected to a time period during which the actuator arm with the head of the head/slider assembly being positioned at any data recording track is moved to engage with the actuator lock and both the actuator arm and actuator lock are stopped at the first position.

The control means stops the application of the drive current when the control means detects a lapse of a predetermined time period from the passage of the head of the head/slider assembly through an inner most data recording track on the rotating data recording disk. And, the predetermined time period is selected to a time period during which the actuator arm with the head of the head/slider assembly passing through the inner most data recording track is moved to engage with the actuator lock and both the actuator arm and actuator lock are stopped at the first position.

In yet another embodiment, a disk drive storage device in accordance with the present invention comprises a data recording disk having a landing zone and a data recording zone surrounding the landing zone; a drive motor containing a plurality of windings for rotating the data recording disk; a head/slider assembly flying above the rotated data recording disk; an actuator arm supporting the head/slider assembly; an actuating means for moving the actuator arm to move the head/slider assembly across the data recording zone and the landing zone along a radial direction of the data recording disk; an actuator lock capable of reciprocally moved between a first position at a center side of the data recording disk and a second position at a peripheral side of the data recording disk and biased toward the second position, the first and second positions being so defined as to position the head/slider assembly above the landing zone at the time of the engagement of the actuator arm and the actuator lock; a first means responsive to a power off condition for applying a drive current due to a counterelectromotive force induced in at least one winding of the windings of the drive motor to the actuator means to move the actuator arm and the actuator lock toward the first position; and a second means for stopping the application of the drive current to the actuator means after a lapse of a predetermined time period.

In the disk drive storage device a plurality of discrete bumps are arranged in the landing zone of the rotating data recording disk.

The predetermined time period is selected to a time period during which the actuator arm with the head of the head/slider assembly being positioned at any data recording track is moved to engage with the actuator lock and both the actuator arm and actuator lock are stopped at the first position.

The drive motor is stopped by the power off condition.

The second means includes a switching means connected between the one winding and a ground level for shunting the one winding to the ground level after a lapse of the predetermined time period.

A method in accordance with the present invention for controlling a disk drive device containing a rotating data recording disk having a data recording zone and a landing zone, an actuator arm supporting a head/slider assembly flying above the rotating data recording disk, an actuating means for moving the actuator arm to move the head/slider assembly across the data recording zone and the landing zone along a radial direction of the rotating data recording disk, and an actuator lock for stopping a movement of the actuator arm to position the head/slider assembly above the landing zone, comprises the steps of detecting a termination of a read/write operation; continuously applying a drive current to the actuating means to maintain an engagement of the actuator arm with the actuator lock; and stopping a rotation of the rotating data recording disk.

In another embodiment, a method in accordance with the present invention for controlling a disk drive device containing a rotating data recording disk having a landing zone and a data recording zone surrounding the landing zone, an actuator arm supporting a head/slider assembly flying above the rotating data recording disk, an actuating means for moving the actuator arm to move the head/slider assembly across the data recording zone and the landing zone along a radial direction of the rotating data recording disk, and an actuator lock capable of reciprocally moved between a first position at a center side of the rotating data recording disk and a second position at a peripheral side of the rotating data recording disk and biased toward the second position, the first and second positions being so defined as to position the head/slider assembly above the landing zone at the time of the engagement of the actuator arm and the actuator lock, comprises steps of detecting a termination of a read/write operation; applying the drive current to the actuating means to move the actuator arm toward the actuator lock; detecting that the actuator arm engaged with the actuator lock reaches the first position; stopping the application of the drive current to cause the actuator lock engaged with the actuator arm to return to the second position; and stopping a rotation of the data recording disk.

In another embodiment, a method in accordance with the present invention for controlling a disk drive device containing a data recording disk having a landing zone and a data recording zone surrounding the landing zone, a drive motor containing a plurality of windings for rotating the data recording disk, an actuator arm supporting a head/slider assembly flying above the rotated data recording disk, a actuating means for moving the actuator arm to move the head/slider assembly across the data recording zone and the landing zone along a radial direction of the data recording disk, and an actuator lock capable of reciprocally moved between a first position at a center side of the data recording disk and a second position at a peripheral side of the data recording disk and biased toward the second position, the first and second positions being so defined as to position the head/slider assembly above the landing zone at the time of the engagement of the actuator arm and the actuator lock, comprises detecting power off condition; applying a drive current due to a counterelectromotive force induced in at least one winding of the windings of the drive motor to the actuator means to move the actuator arm and the actuator lock toward the first position; and stopping the application of the drive current to the actuator means after a lapse of a predetermined time period.

An advantage of the present invention is that it minimizes the damage to the bumps of laser texturing in the landing zone of the disk during CSS operations and thereby increases the life span of the disk drive storage device.

The above, as well as additional objects, features and advantages of the present invention will become apparent in the following detailed written description.

DETAILED DESCRIPTION OF THE PREFERRED EMRODIMENT

This invention is described in a preferred embodiment in the following description with reference to the Figures, in which like numbers represent the same or similar elements. While this invention is described in terms of the best mode for achieving this inventions objectives, it will be appreciated by those skilled in the art that variations may be accomplished in view of these teachings without deviating from the spirit or scope of the present invention.

Figure 1:
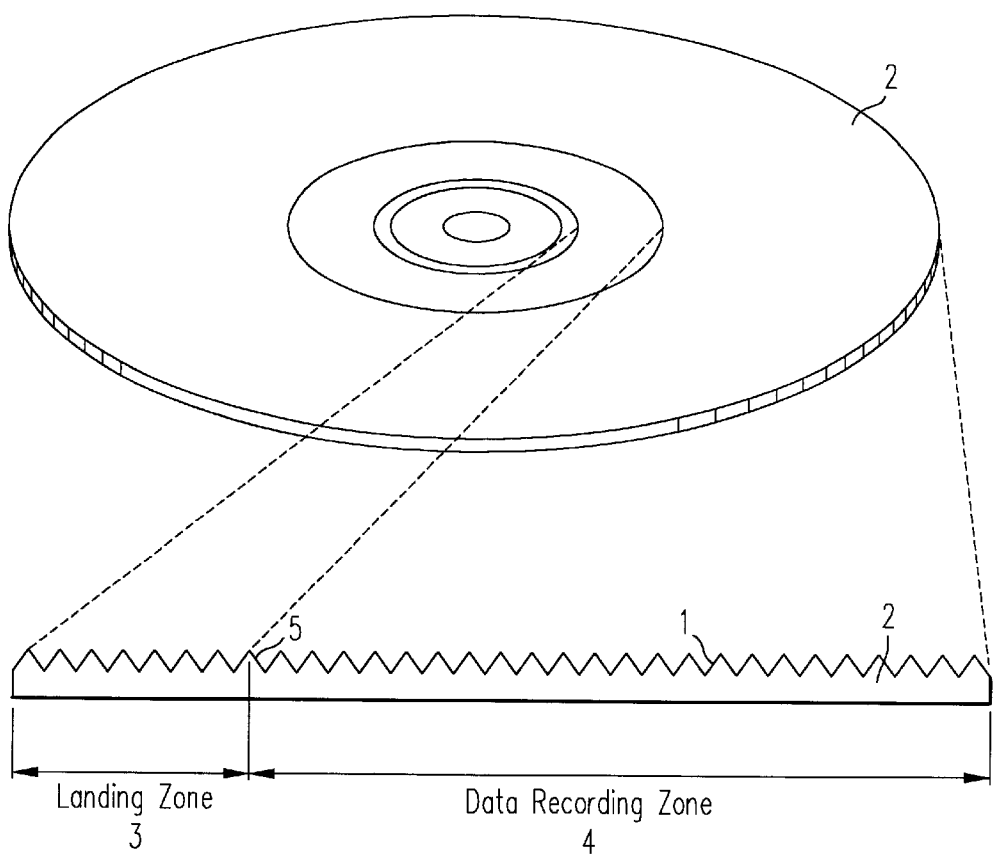
FIG. 1 shows the hard disk with the mechanical texture.
Figure 2A:
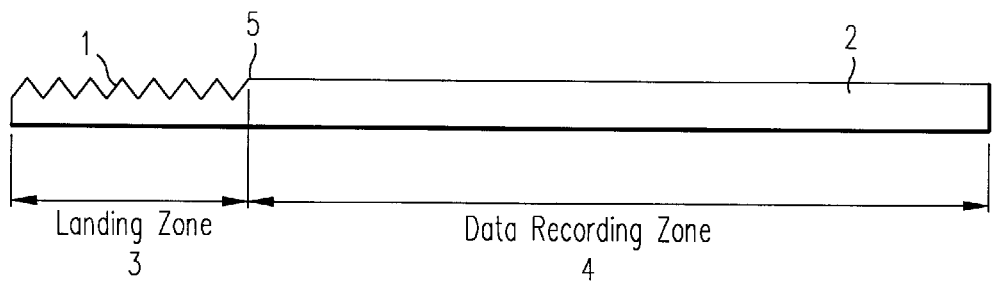
FIGS. 2A and 2B show structures of the hard disk with the mechanical texture.
Figure 2B:
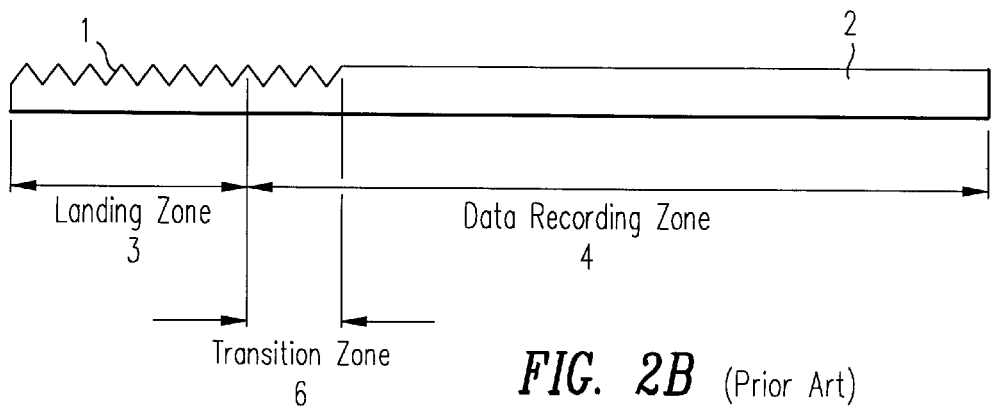
Figure 3:
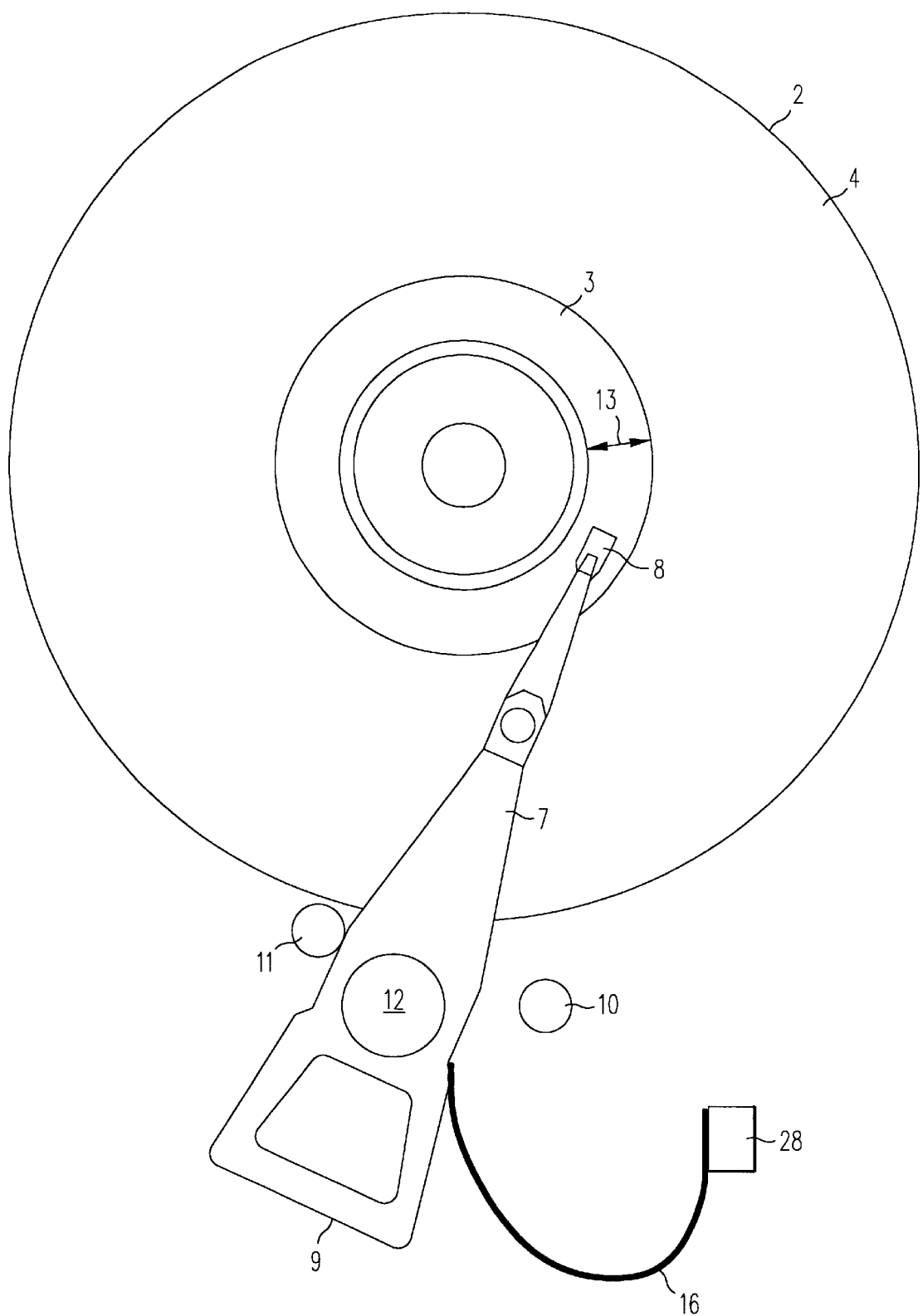
FIG. 3 shows the hard disk and the actuator arm.
Figure 4A:
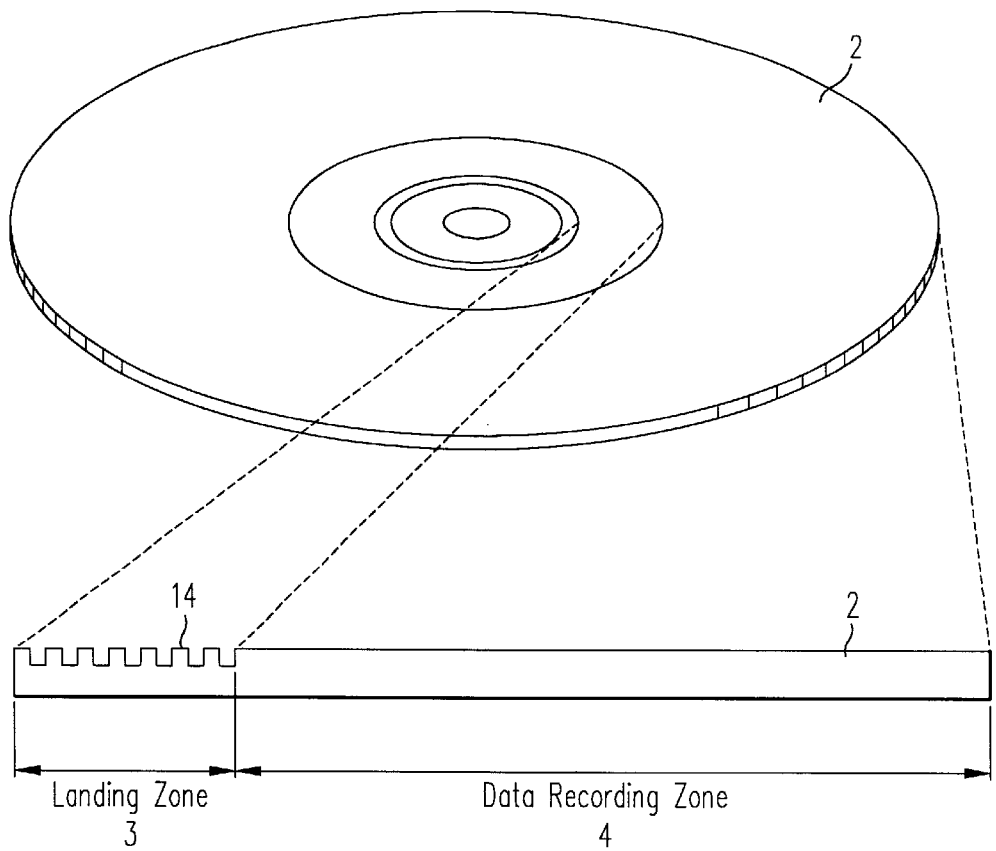
FIGS. 4A and 4B show the hard disk with the laser texture.
Figure 4B:
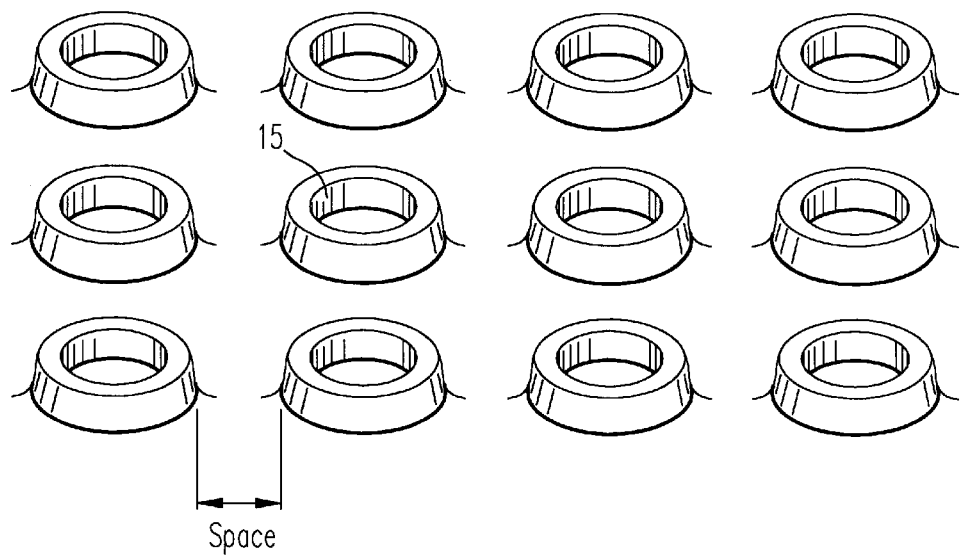
Figure 5:
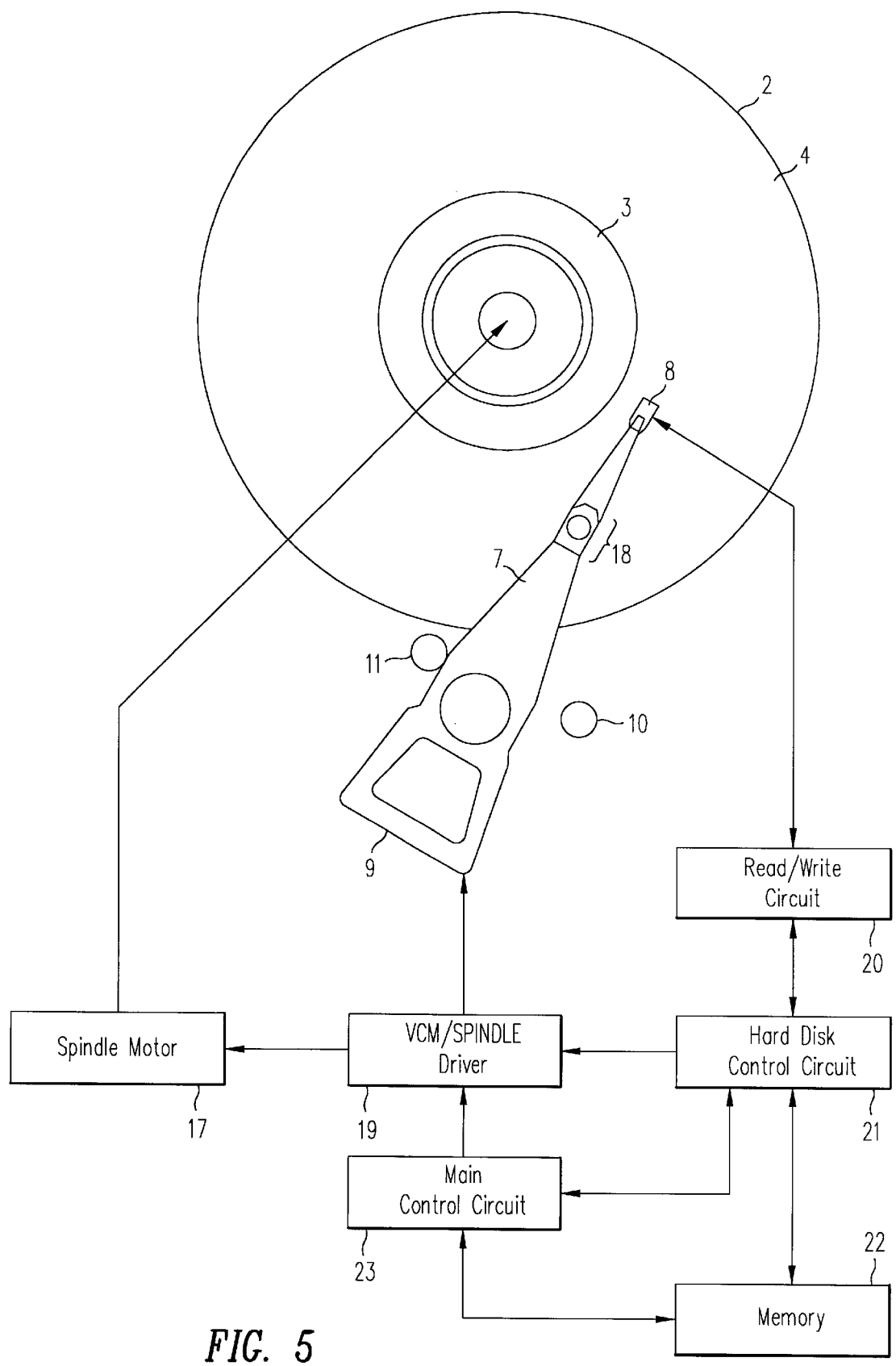
FIG. 5 is a simplified block diagram showing the hard disk drive device into which the control scheme of the present invention is used.

FIG. 5 shows a block diagram of the circuits contained in the hard disk drive device. The landing zone 3 is formed at an inner position on the rotating data recording disk 2, and the data recording zone 4 is formed to surround the landing zone 3. The bumps 15 of the laser texture 14 as shown in the FIG. 4 are formed on the surface of the landing zone 3 of the hard disk 2 of the hard disk drive device of the present invention. A spindle motor 17 for rotating the magnetic recording hard disk 2 and the voice coil motor (VCM) 9 are controlled by a VCM/spindle driver 19. The VCM 9 operates as an actuating means for moving the actuator arm 7 across the data recording zone 4 and the landing zone 3 along the radial direction of the rotating data recording disk or hard disk 2. Only one magnetic recording hard disk 2 is shown for simplifying the drawing. The read/write circuit 20 is connected to a hard disk control circuit 21, which is also connected to the VCM/spindle driver 19. A memory 22 for storing data and control data is connected to the circuit 21 and a main control circuit or MPU 23, which controls the VCM/spindle driver 19, the hard disk control circuit 21 and the memory 22. The read/write head is mounted on a slider, these are called as a head/slider assembly 8. The head/slider assembly 8 is mounted on the front end of the actuator arm 7. And, the rear end of the actuator arm 7 is pivotally mounted on the frame of the hard disk drive device. An inner actuator lock 11 is mounted on the frame to engage the actuator arm 7 to position the read/write head on the landing zone 3, and an outer actuator lock 10 is mounted on the frame to engage the actuator arm 7 to position the read/write head on an outer most data recording track in the data recording zone 4.

Figure 6:
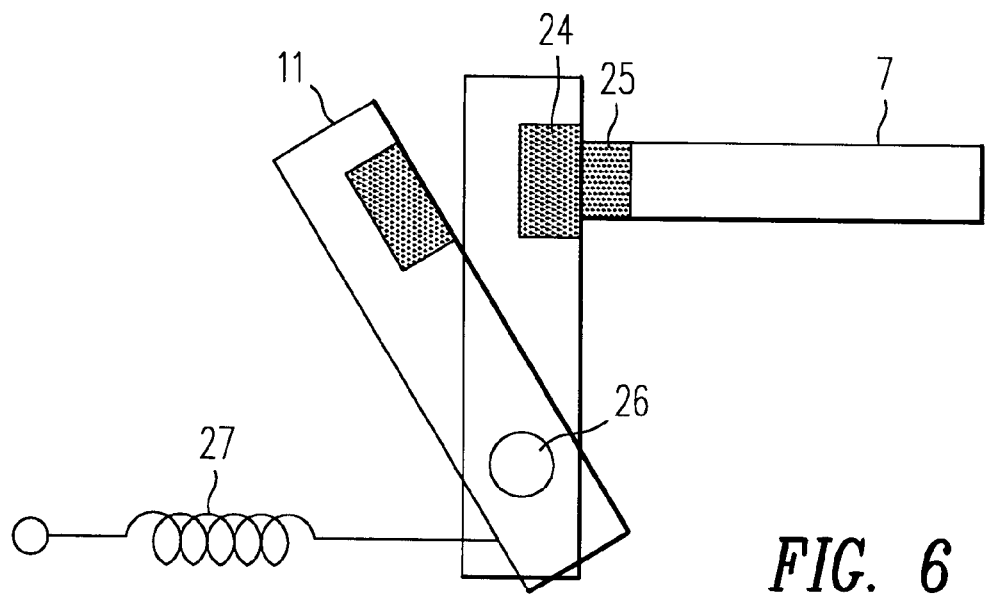
FIG. 6 is a schematic representation showing the structure of the inner actuator lock.

FIG. 6 shows the inner actuator lock 11 and the actuator arm 7. A magnet 24 is mounted on the actuator lock 11, and an iron piece 25 is mounted on the actuator arm 7. The actuator lock 11 is pivotally mounted on the frame of the hard disk drive device at a pivot point 26. The actuator lock 11 is biased in a clockwise direction by a spring 27. The magnetic coupling of the magnet 24 and the iron piece 25 is provided to keep the actuator arm 7 to the actuator lock 11 during the power off state of the hard disk drive device for preventing the actuator arm 7 to freely move above the hard disk 2 and to keep the actuator arm 7 to the actuator lock 11 in the second and third embodiments later described. The inner actuator lock 11 is capable of reciprocal movement between a first position, i.e. a left position in the FIG. 6, inside of the rotating data recording disk 2 and a second position, i.e. a right position in the FIG. 6, outside of the rotating data recording disk 2. The first and second positions are so defined that the head/slider assembly 8 is positioned above the landing zone 3 whenever the actuator arm 7 engages with the inner actuator lock 11. When the actuator arm 7 engages with the inner actuator lock 11, the head/slider assembly 8 is positioned on the landing zone 3. When the actuator arm 7 engages with the outer actuator lock 10, the head/slider assembly 8 is positioned on the outer most data recording track.

Figure 7:
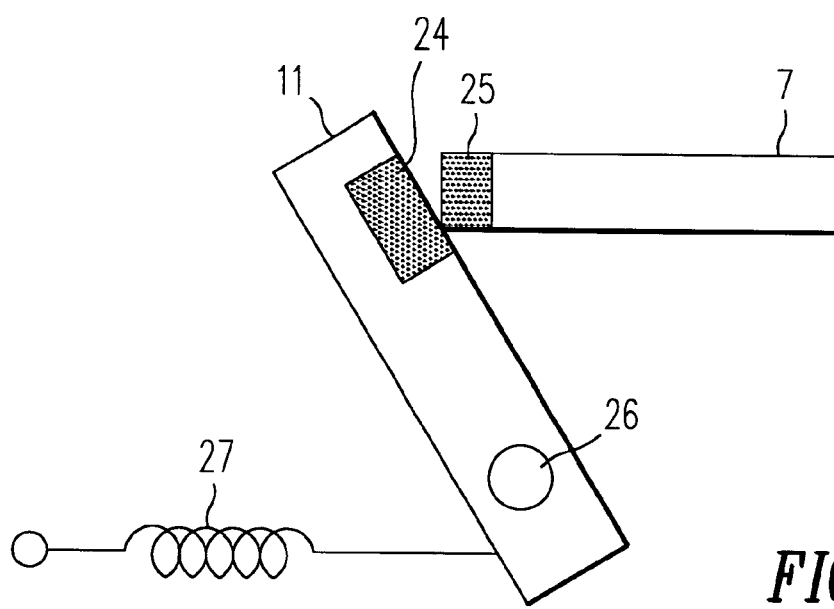
FIG. 7 is a schematic diagram which shows an operation of the first embodiment of the inner actuator lock in accordance with the present invention.
Figure 8:
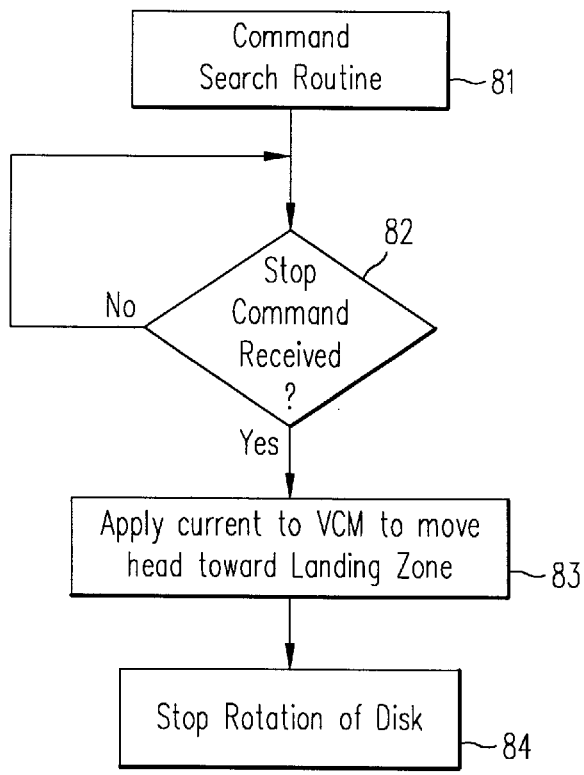
FIG. 8 is a flow diagram which shows the first control scheme of the first embodiment of the present invention.

FIGS. 7 through 10 show a first embodiment of the present invention. In the first embodiment, the MPU 23 controls the VCM/spindle driver 19 to continuously apply the current to the VCM 9 causing the actuator arm 7 and the actuator lock 11 to be stopped and maintained at the first position, as shown in the FIG. 7, when a stop command indicating a termination of the read/write operation is received during the read/write operation. FIG. 8 shows a first control scheme for applying the current to the VCM 9. In FIG. 8, the command search routine starts at a command search block 81. The operation proceeds to a decision block 82 wherein the MPU 23 determines whether the stop command is received, or not. If the answer of the block 82 is NO, the operation returns to this block 82. If the answer of the block 82 is YES, the operation proceeds to a block 83 wherein the MPU 23 and the VCM/spindle driver 19 continuously apply a sufficient current to the VCM 9 to move and maintain the actuator arm 7 and the actuator lock 11 at the first position, whereby the head/slider assembly 8 is stopped at a position corresponding to the first position without the relative motion between the actuator arm 7 and the landing zone 3 in the radial direction of the hard disk 2. After the stop of the head/slider assembly 8, the operation proceeds to a block 84 where the rotation of the spindle motor 17 is stopped under the control of the VCM/spindle driver 19, so that an air bearing force between the head/slider assembly 8 and the surface of the landing zone 3 is gradually decreased, and the head/slider assembly 8 biased toward the surface of the hard disk 2 can land on the landing zone 3 without being moved in the radial direction. To detect the stop of the actuator arm 7 at the first position, the operation of blocks 93 and 94 in FIG. 9 or operation of blocks 104 through 106 in FIG. 10 can be used. Describing the bias of the head/slider assembly 8 toward the surface of the hard disk 2, the actuator arm 7 is provided with a bending portion 18, as shown in FIG. 5, by which the head/slider assembly 8 is biased toward the surface of the hard disk 2. When the hard disk 2 is rotated, the air bearing force is generated between the lower surface of the head/slider assembly 8 and the surface of the hard disk 2, and when the rotation of the hard disk 2 is stopped, the air bearing force is gradually decreased, and the head/slider assembly 8 is finally landed on the surface of the hard disk 2 by the biasing force of the bending portion 18. The damage of the bumps 15 in the landing zone 3 due to the movement of the head/slider assembly in the radial direction is removed by the control scheme shown in the FIG. 8.

Figure 9:
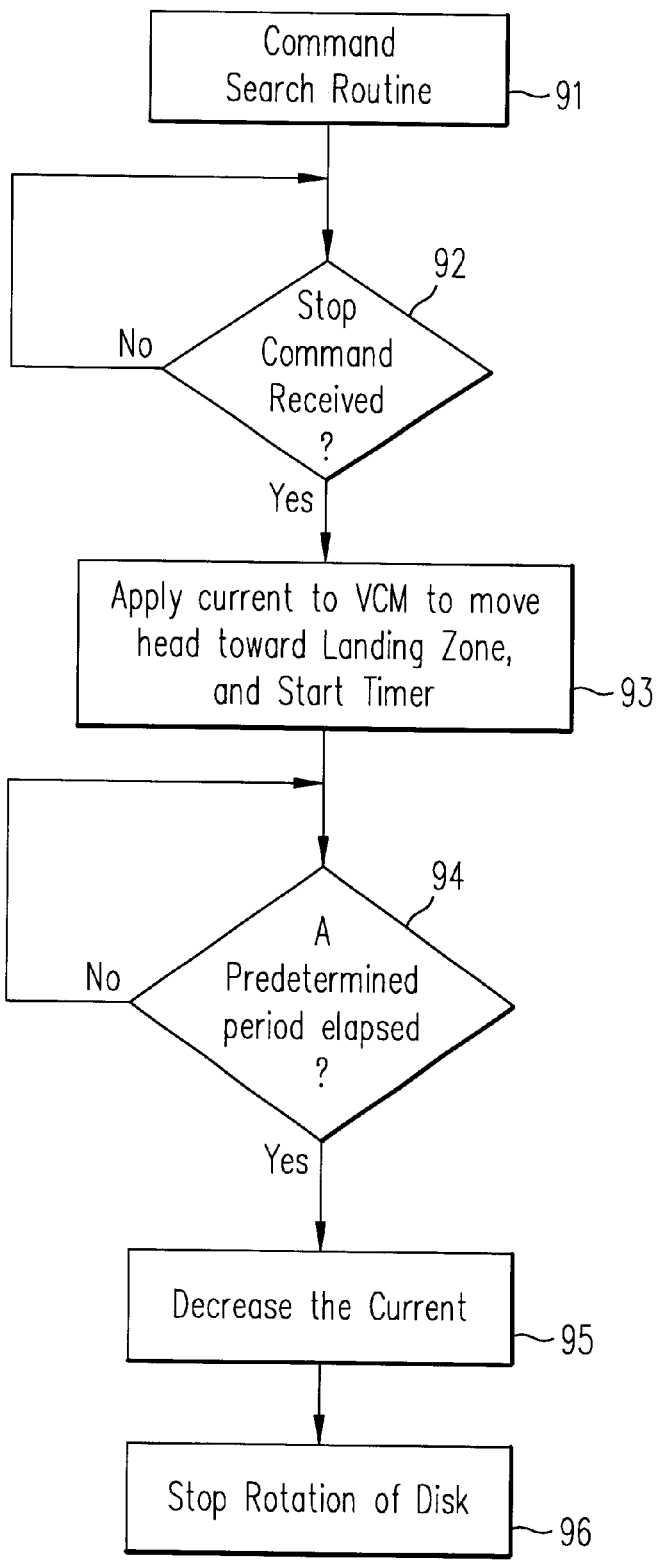
FIG. 9 is a flow diagram which shows the second control scheme of the first embodiment of the present invention.
Figure 10:
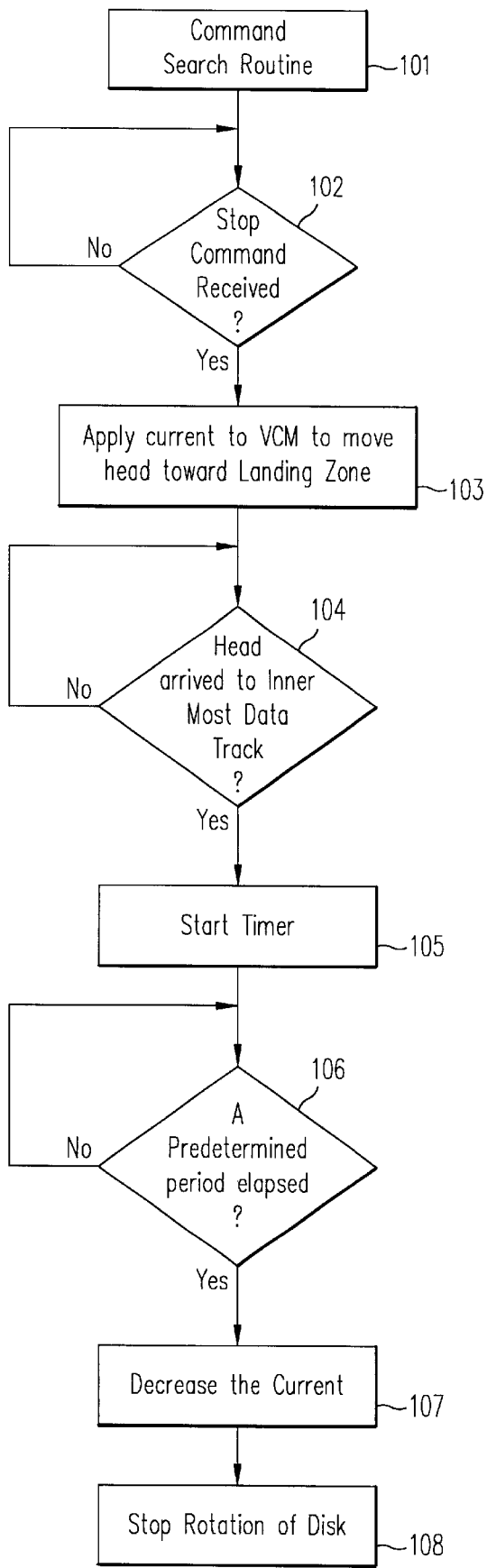
FIG. 10 is a flow diagram which shows the third control scheme of the first embodiment of the present invention.

A value, i.e. a first value, of the current continuously applied to the VCM 18 in the block 83 can be decreased to a predetermined second value, which is sufficient to maintain the engagement of the actuator arm 7 with the actuator lock 11 at the first position, such as about one tenth of the first value to save the power in a second and third control schemes shown in the FIGS. 9 and 10. In the second control scheme shown in FIG. 9, the operation of blocks 91 and 92 are the same as that of the blocks 81 and 82 in FIG. 8. In a block 93, the MPU 23 and the VCM/spindle driver 19 continuously apply a current of the first value to the VCM 18 to move the actuator arm 7 and the actuator lock 11 to the first position, and the MPU 23 starts a timer contained in the MPU 23. The operation proceeds to a block 94 in which the MPU 23 determines whether a predetermined time period for causing the actuator arm 7 with the read/write head of the head/slider assembly 8 being positioned at any data track of the data recording zone 4 to move to the first position of the actuator lock 11 has been elapsed, or not. That is, the time period used in the block 94 is selected to a value or a time period during which the actuator arm 7 with the read/write head of the head/slider assembly 8 being positioned at any data recording track is moved to engage with the actuator lock 11 and both the actuator arm 7 and actuator lock 11 are stopped at the first position of the inner actuator lock 11, as shown in the FIG. 7. If the answer of the block 94 is NO, the operation returns to this block 94. The answer YES of the block 94 means that the MPU 23 detects that the actuator arm 7 and the inner actuator lock 11 reaches the first position of the inner actuator lock 11 shown in the FIG. 7, and stopped at the first position. If the answer of the block 94 is YES, the operation proceeds to a block 95 in which the MPU 23 and the VCM/spindle driver 19 decrease the first value of the current applied to the VCM 18 to the second value. The operation proceeds to a block 96 wherein the MPU 23 stops the rotation of the spindle motor 17 and the hard disk 2, whereby the head/slider assembly 8 biased toward the surface of the hard disk 2 can land on the landing zone 3 without being moved in the radial direction. In this manner, the damage of the bumps 15 in the landing zone due to the movement of the head/slider assembly in the radial direction is removed.

In the third control scheme in the FIG. 10, the operation of blocks 101, 102 and 103 are the same as that of the blocks 81, 82 and 83 in the FIG. 8. In the block 103, the MPU 23 and the VCM/spindle driver 19 apply the current of the first value to the VCM 18. In a block 104, the MPU 23 determines whether the read/write head arrives at an inner most data track of the data recording zone 4 by detecting a servo track number sensed by the read/write head. If the answer of the block 104 is NO, the operation returns to this block 104. If the answer of the block 104 is YES, the operation proceeds to a block 105 in which the MPU starts a timer contained in the MPU. The operation proceeds to a block 106 in which the MPU 23 determines whether a predetermined time period for causing the actuator arm 7 with the read/write head of the head/slider assembly 8 at the inner most data recording track to move to the first position of the actuator lock 11 has been elapsed, or not. That is, the time period used in the block 106 is selected to a value or a time period during which the actuator arm 7 with the read/write head of the head/slider assembly 8 passing through the inner most data recording track is moved to engage with the actuator lock 11 and both the actuator arm 7 and actuator lock 11 are stopped at the first position of the inner actuator lock 11, as shown in the FIG. 7. The answer YES of the block 106 means that the MPU 23 detects that the actuator arm 7 and the inner actuator lock 11 reaches the first position of the inner actuator lock 11 shown in the FIG. 7, and stopped at the first position. If the answer of the block 106 is NO, the operation returns to this block 106. If the answer of the block 106 is YES, the operation proceeds to a block 107 in which the MPU 23 and the VCM/spindle driver 19 decrease the first value of the current applied to the VCM 9 to the second value. The operation proceeds to a block 108 wherein the spindle motor 17 is stopped under the control of the MPU 23 and VCM/spindle driver 19, so that an air bearing force between the head/slider assembly 8 and the surface of the landing zone 3 is gradually decreased, whereby the head/slider assembly 8 biased toward the surface of the hard disk 2 can land on the landing zone 3 without being moved in the radial direction. In this manner, the damage of the bumps 15 in the landing zone due to the movement of the head/slider assembly in the radial direction is removed.

FIGS. 11A–C through 16 show a second embodiment of the present invention. In the second embodiment, the MPU 23 controls the VCM/spindle driver 19 to apply the current to the VCM 9, causing the actuator arm 7 and the actuator lock 11 to be moved to the first position of the actuator lock 11, as shown in the FIG. 11B, when a stop command indicating a termination of the read/write operation is received during the read/write operation. And, the MPU 23 and the VCM/spindle driver 19 stop the application of the current to the VCM 9 when the MPU 23 detects that the actuator arm 7 and the actuator lock 11 has been moved to the first position. Then, the actuator lock 11 returns to the second position by the biasing force of the spring 27. During the return of the actuator lock 11, the actuator arm 7 is contacted to the actuator lock 11 due to the magnetic coupling of the magnet 24 and the iron peace 25.

Figure 11A:
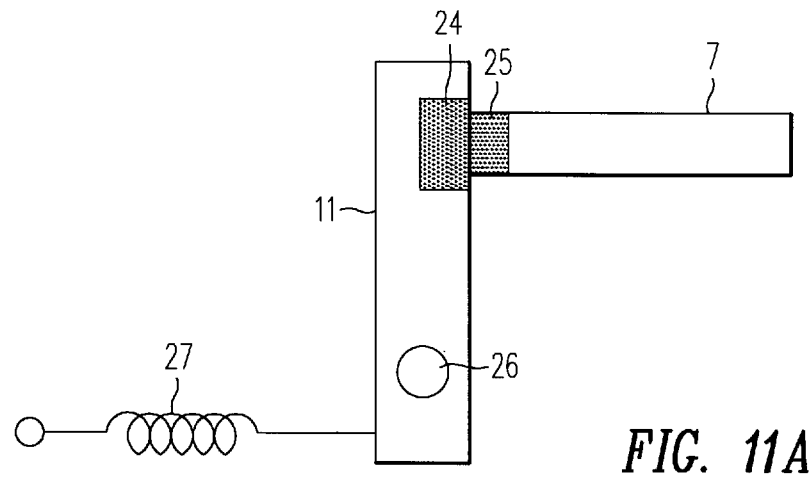
FIGS. 11A, 11B and 11C are schematic diagrams showing an operation of the second embodiment of the inner actuator lock in accordance with the present invention.
Figure 11B:
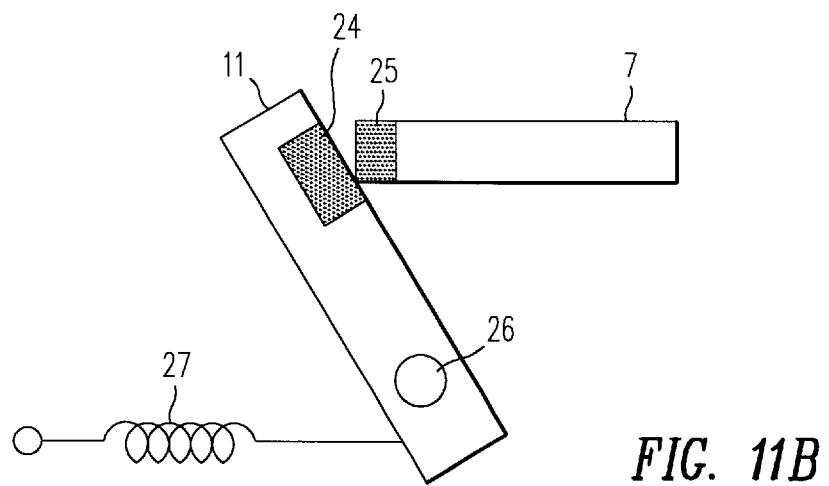
Figure 11C:
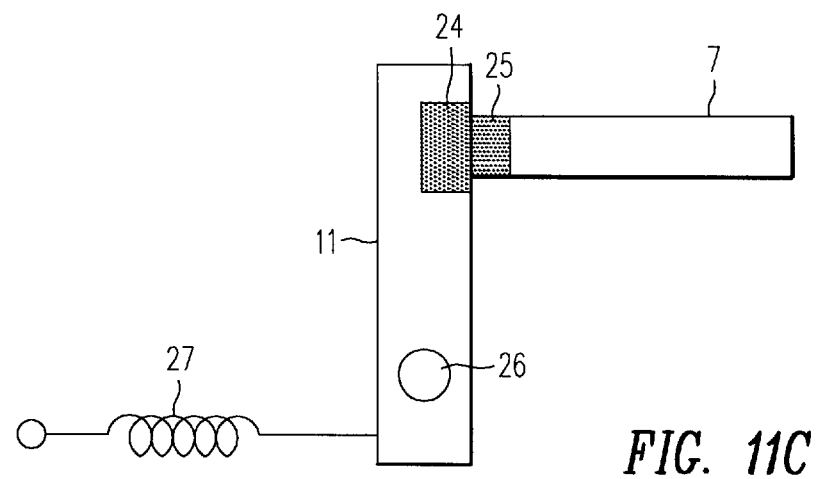
Figure 12:
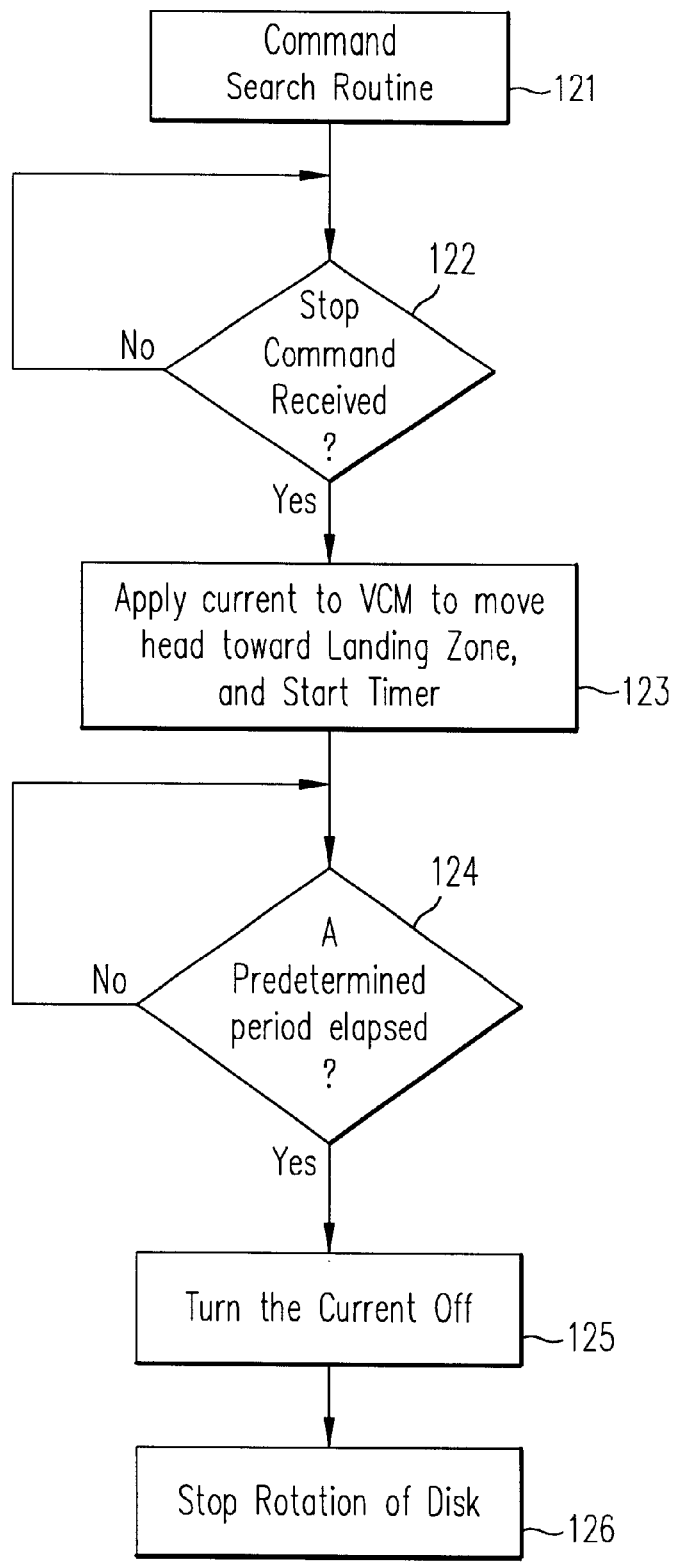
FIG. 12 is a flow diagram that shows the first control scheme of the second embodiment of the present invention.
Figure 15:
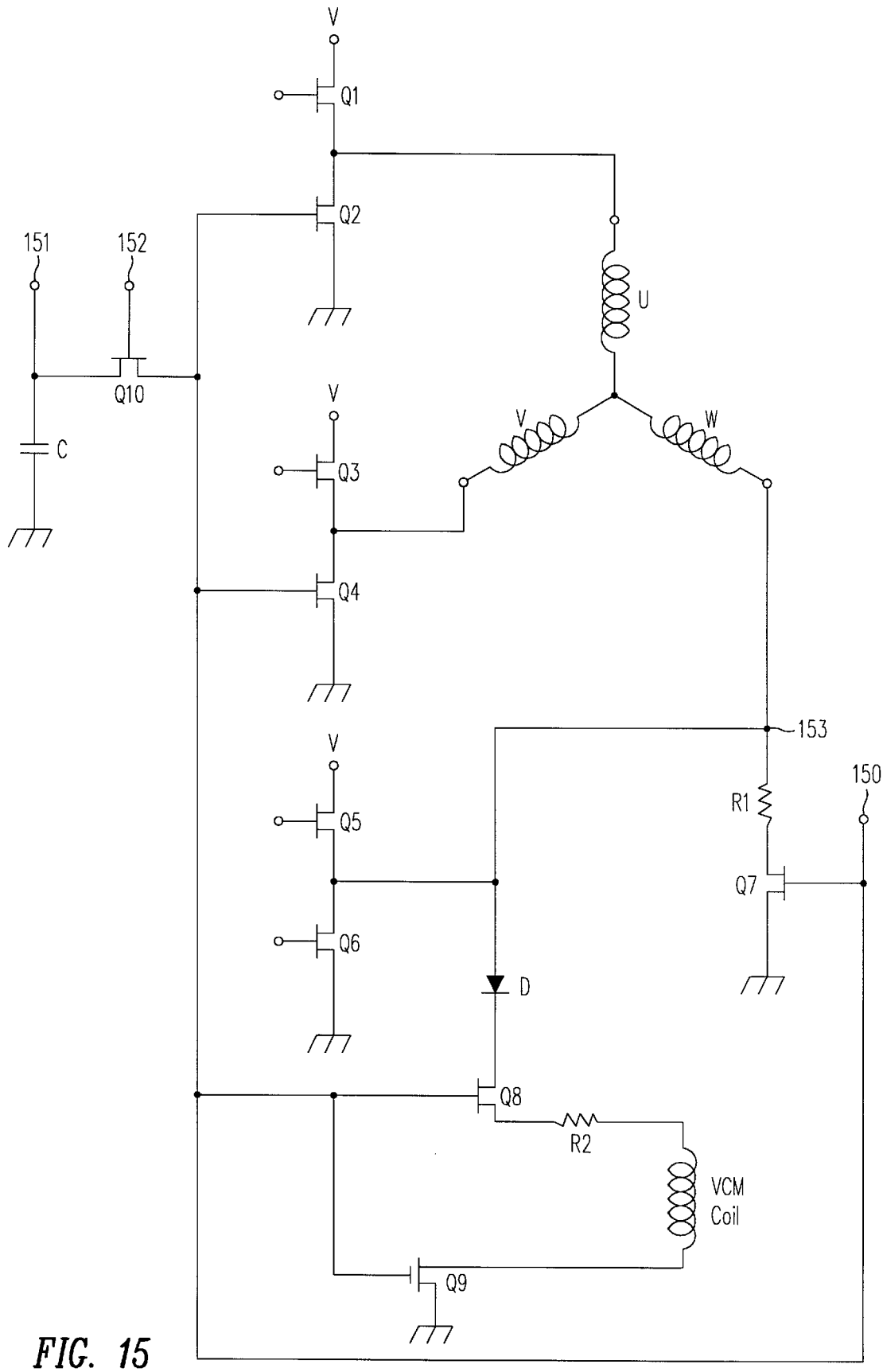
FIG. 15 is a circuit diagram showing the circuit configuration for performing the third control scheme of the second embodiment of the present invention.
Figure 16:
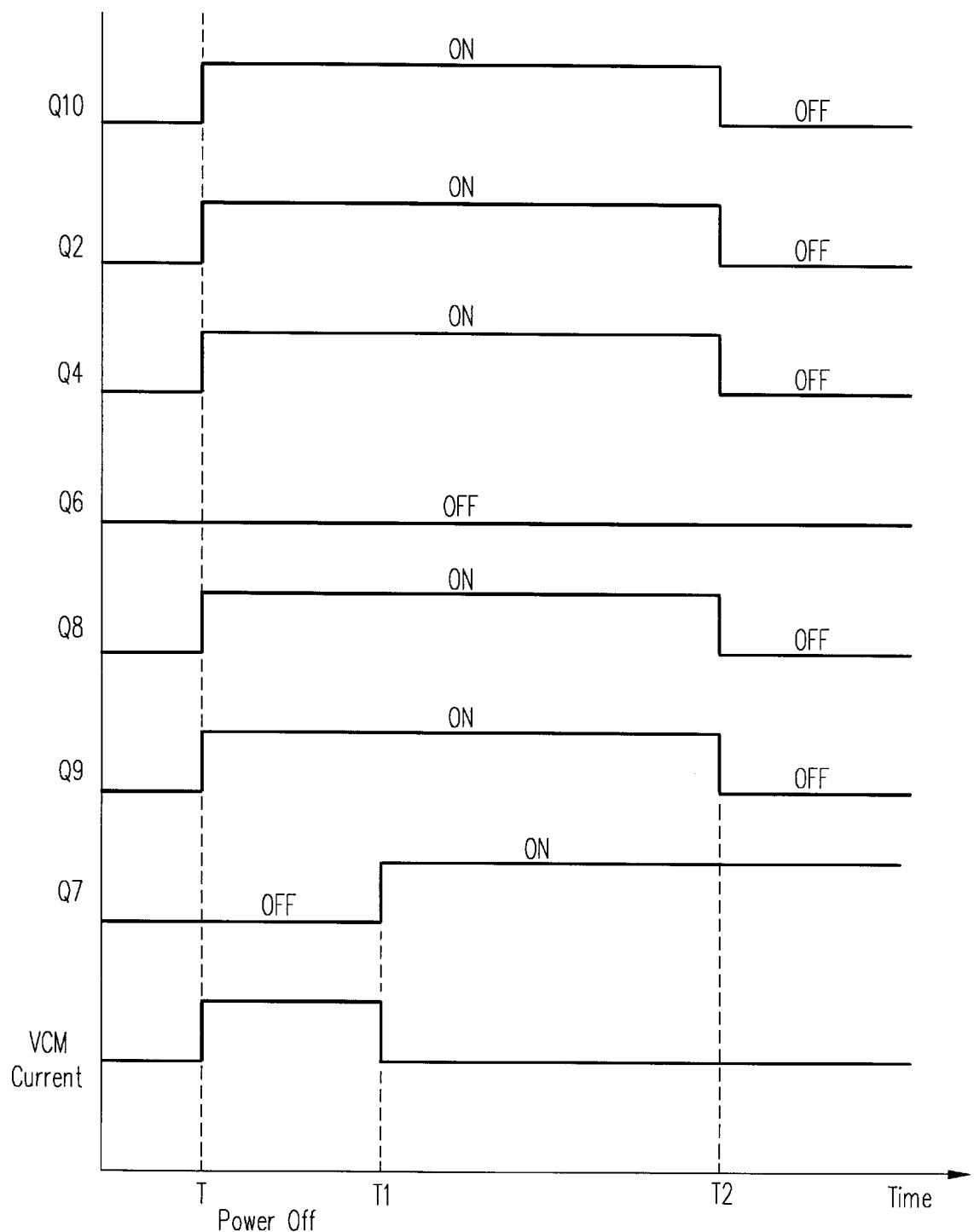
FIG. 16 is a graph showing the timing chart of the operation of the circuit elements in the circuit shown in the FIG. 15.

FIG. 12 shows a first control scheme of the second embodiment. The operation of the blocks 121 through 124 in FIG. 12 is the same as that of the blocks 91 through 94 in FIG. 9. The answer YES of the block 124 indicates that the actuator lock 11 and the actuator arm 7 have been moved to the first position of the actuator lock 11, as shown in FIG. 11B. The time period used in the block 124 is selected to a value or a time period during which the actuator arm 7 with the read/write head of the head/slider assembly 8 being positioned at any data recording track is moved to engage with the actuator lock 11 and both the actuator arm 7 and actuator lock 11 are stopped at the first position of the inner actuator lock 11, as shown in FIG. 11B. If the answer of the block 124 is YES, the operation proceeds to a block 125, in which the MPU 23 and the VCM/spindle driver 19 turn the current to the VCM 9 off, and a circuit path from the winding of the spindle motor 17 to the VCM 9 is shunted to a ground level. Describing briefly the shunting operation of the path extending from the winding of the spindle motor to the VCM with reference to FIG. 15, the prior VCM spindle driver contains a circuit, which does not include a resistor R1 and a FET Q7, for automatically landing the head/slider assembly 8 on the landing zone 3 by applying a current due to a counterelectromotive force induced in one of spindle windings, such as a winding W to the VCM 9, when the power to the hard disk drive device is turned off. It is noted that the resistor R1, the FET Q7 and a control scheme are added in accordance with the present invention to realize the shunting operation. Detail operation of the circuit of the FIG. 15 is latter described. At this stage, it is described that in the block 125, the VCM/spindle driver 19 applies a drive pulse to a node 150 in FIG. 15 to turn the FET Q7 on, so that the path from the winding W of the spindle motor 17 to the VCM 9 is shunted to the ground level, whereby any current due to the counterelectromotive force induced in the winding W causing the undesired movement of the head/slider assembly 8 in the radial direction 13 shown in FIG. 7 is not applied to the VCM 9. The actuator lock 11 returns from the first position of the FIG. 11B to the second position of the FIG. 11C by the biasing force of the spring 27. During the return of the actuator lock 11, the actuator arm 7 is contacted to the actuator lock 11 due to the magnetic coupling of the magnet 24 and the iron peace 25. After a laps a time period for returning to the actuator lock 11 engaged with the actuator arm 7 to the second position, the operation proceeds to a block 126 wherein the spindle motor 17 is stopped under the control of the MPU 23 and the VCM/spindle driver 19, so that an air bearing force between the head/slider assembly 8 and the surface of the landing zone 3 is gradually decreased, whereby the head/slider assembly 8 biased toward the surface of the hard disk 2 can land on the landing zone 3 without being moved in the radial direction. In this manner, the damage of the bumps 15 in the landing zone due to the movement of the head/slider assembly in the radial direction is removed.

Figure 13:
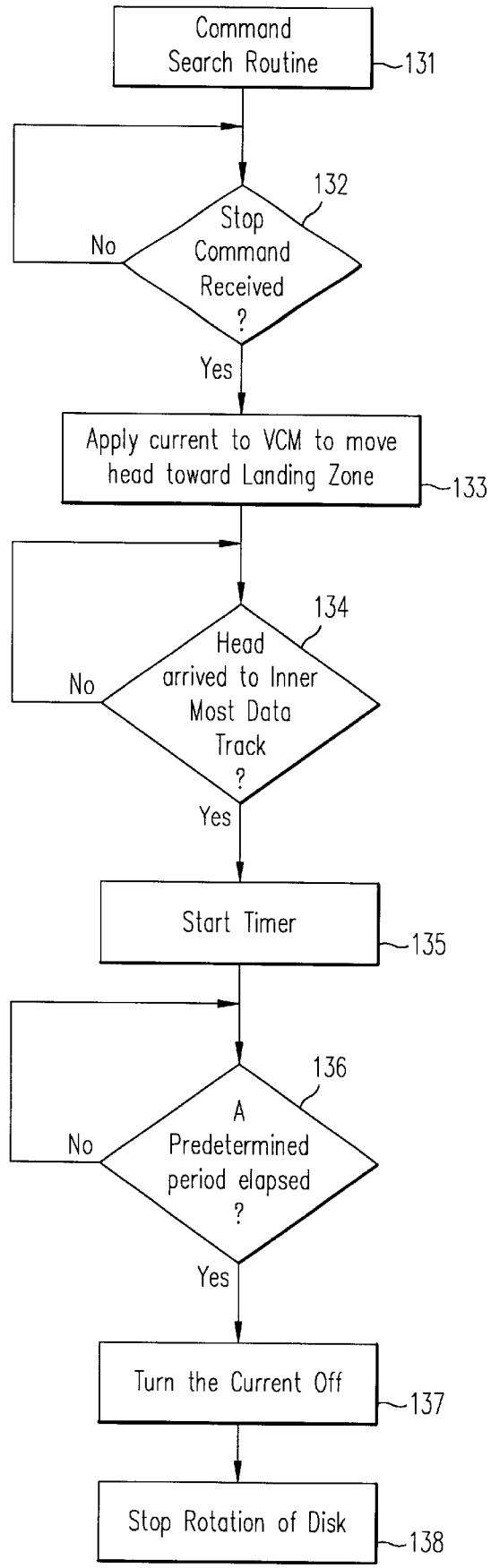
FIG. 13 is a flow diagram which shows the second control scheme of the second embodiment of the present invention.

FIG. 13 shows a second control scheme of the second embodiment. The operation of the blocks 131 through 136 is the same as that of the blocks 101 through 106 in FIG. 10. The answer YES of the block 136 indicates that the actuator lock 11 and the actuator arm 7 have been moved to the first position of the actuator lock 11, as shown in FIG. 11B. The time period used in block 136 is selected to a value or a time period during which the read/write head of the actuator arm 7 with the head/slider assembly 8 passing through the inner most data recording track is moved to engage with the actuator lock 11 and both the actuator arm 7 and actuator lock 11 are stopped at the first position of the inner actuator lock 11, as shown in FIG. 11B. If the answer of the block 136 is YES, the operation proceeds to a block 137, in which the MPU 23 and the VCM/spindle driver 19 turn the current to the VCM 9 off, and the circuit path from the winding of the spindle motor to the VCM 9 is shunted to a ground level, in the same manner as that in the block 125 in FIG. 12, whereby the actuator lock 11 returns to the second position by the biasing force of the spring 27, as shown in FIG. 11C. During the return of the actuator lock 11, the actuator arm 7 is contacted to the actuator lock 11 due to the magnetic coupling of the magnet 24 and the iron peace 25. After a lapse of a time period for returning the actuator lock 11 engaged with the actuator arm 7 to the second position, the operation proceeds to a block 138 wherein the spindle motor 17 is stopped under the control of the VCM/spindle driver 19, so that an air bearing force between the head/slider assembly 8 and the surface of the landing zone 3 is gradually decreased, whereby the head/slider assembly 8 biased toward the surface of the hard disk 2 can land on the landing zone 3 without being moved in the radial direction. In this manner, the damage of the bumps 15 in the landing zone due to the movement of the head/slider assembly in the radial direction is removed.

Figure 14:
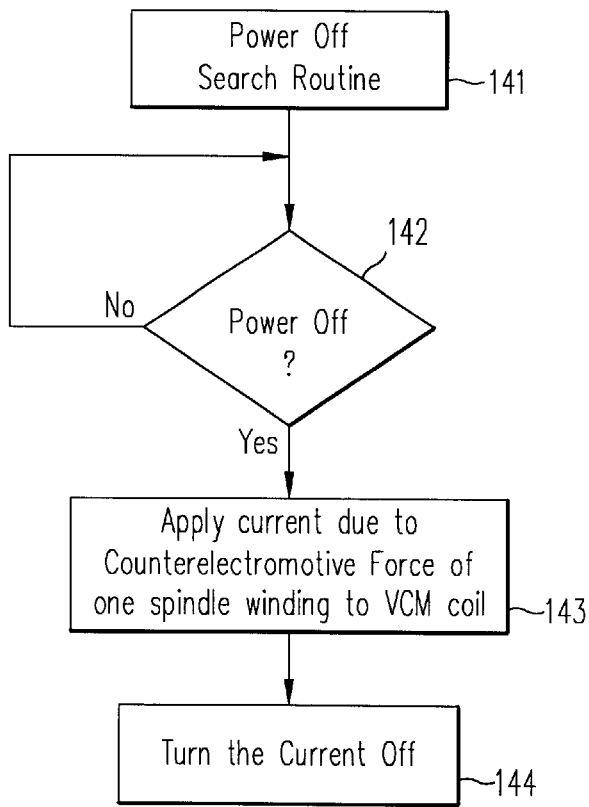
FIG. 14 is a flow diagram that shows the third control scheme of the second embodiment of the present invention.

FIG. 14 shows a third control scheme of the second embodiment. This third control scheme relates to an automatic positioning of the actuator arm 7 to the second position shown in the FIG. 11C when the power of the hard disk drive device is turned off. As described before, the prior VCM spindle driver contains the circuit which does not include a resistor R1 and a FET Q7 shown in the FIG. 15, for automatically landing the head/slider assembly 8 on the landing zone 3 by applying a current due to a counterelectromotive force induced in one of spindle windings, such as a winding W to the VCM 9, when the power to the hard disk drive device is turned off. And, the resistor R1 and the FET Q7 are added to the circuit in accordance with the present invention.

Describing the operation of the prior circuit of the FIG. 15 which does not include the resistor R1 and the FET Q7, drive pulses are sequentially applied to gate terminals of FETs Q1, Q3 and Q5 connected to the windings U, V and W of the spindle motor 17, respectively to rotate the spindle motor 17. During the rotation of the spindle motor 17, a voltage is applied to a node 151 to charge a capacitor C, and a voltage is applied to a node 152 to turn a FET Q10 off. When the power to the hard disk drive device is turned off at a time $T_{power}$ off shown in the FIG. 16 by some reasons, the voltage at the gate 152 of the FET Q10 is removed to turn the FET Q10 on, so that the charges stored in the capacitor C are applied to the gates of the FETs Q2, Q4, Q8 and Q9 to turn them on from the time TPOWER OFF to the time T2, as shown in the FIG. 16. When the voltage applied to the spindle motor 17 is turned off, the current due to the counterelectromotive force of the winding W is applied to the VCM coil through a diode D, the turned on FET QB and a resistor R2, so that the VCM 9 and the actuator arm 7 is moved toward the inner actuator lock 11. The inventors of the present invention have found that the probability of landing of the head/slider assembly 8 on the landing zone 3 during the period that the VCM 9, the actuator arm 7 and the head/slider assembly 8 are moving in the radial direction above the landing zone 3 is relatively high, whereby the bumps 15 of the laser texture 14 shown in the FIG. 4 are remarkably damaged, and the durability of the surface of the landing zone 3 is remarkably decreased, as latter described with reference to an experimental result performed by the inventors of the present invention.

To solve the above problem, the resistor R1 and the FET Q7 is connected between a node 153 of the path between the spindle winding W and the VCM coil and the ground level. A gate terminal of the FET Q7 is connected to the source terminal of the FET Q10. An operational characteristic of the FET Q7 is selected to turn on at a time T1, as shown in the FIG. 16. The time period between the time TPOWER OFF and the time T1 is selected to a value or a time period during which the actuator arm 7 with the read/write head of the head/slider assembly 8 at any position of the data recording zone 4 is moved to engage with the inner actuator lock 11, and both the actuator arm 7 and the actuator lock 11 are stopped at the second position. In this manner, the spindle winding W and the VCM coil are shunted to the ground level, after that both the actuator arm 7 and the actuator lock 11 are stopped at the second position. After the stop of the movement of the head/slider assembly 8, the head/slider assembly 8 lands on the landing zone 3 as the rotational speed of the hard disk 2 is gradually decreased.

FIG. 14 shows the operational sequence performed by the above described operation. In a block 141, a power off search routine is started. The operation proceeds to a block 142 wherein the determination as to whether the power is off, or not is made. If the answer of the block 142 is NO, the operation returns to this block 142. If the answer of the block 142 is YES, the operation proceeds to a block 143 wherein the current due to the counterelectromotive force induced in the spindle winding W is applied to the VCM coil, as described above. The operation proceeds to a block 144 wherein the FET Q7 shown in the FIG. 15 is turned on to shunt the spindle winding W and the VCM coil to the ground level, as described above. After the stop of the movement of the head/slider assembly in the radial direction of the hard disk 2, the head/slider assembly 8 lands on the landing zone 3 as the rotational speed of the hard disk 2 is gradually decreased.

The followings are the experimental result performed by the inventors of the present invention. Eight prior hard desk drive devices each of which contains the head/slider assembly capable of moving in the radial direction of the hard disk during the landing operation and eight hard disk drive devices which are operated in the control schemes of the first and second embodiments are prepared. The experiment was performed in an ambient of a temperature of 40 degrees centigrade. Two of the eight prior hard disk drive devices were failed after 8,000 CSS operations due to the damage of the landing zone. Three of the eight prior hard disk drive devices were failed after 12,000 CSS operations due to the damage of the landing zone. In contrast, all the eight hard disk drive devices with the control scheme of the present invention were not failed after 40,000 CSS operations. It has been confirmed that the surfaces of the landing zones of all the eight hard disk drive devices of the present invention were not damaged after the 40,000 CSS operations.

The present invention realizes the hard disk drive device, the landing zone of which is not damaged even after the 40,000 CSS operations.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely illustrative and limited in scope only as specified in the appended claims.

We claim:

1. A disk drive device comprising:
   a rotating data recording disk having a data recording zone and a landing zone;
   a head/slider assembly flying above said rotating data recording disk;
   an actuator arm supporting said head/slider assembly;
   an actuating means for moving said actuator arm to move said head/slider assembly across said data recording zone and said landing zone along a radial direction of said rotating data recording disk;
   an actuator lock for stopping a movement of said actuator arm to position said head/slider assembly above said landing zone; and
   a control means for responding to a termination of a read/write operation to apply a drive current for moving said actuator arm toward said actuator lock;
   wherein said control means continuously applies said drive current to said actuating means after engagement of said actuator arm and said actuator lock to maintain an engagement of said actuator arm with said actuator lock stopped at a predetermined position, after said termination of read/write operation, and stops a rotation of said rotating data recording disk.

2. The disk drive device according to claim 1 wherein a plurality of discrete bumps are arranged in said landing zone.

3. A method for controlling a disk drive device containing a rotating data recording disk having a data recording zone and a landing zone, an actuator arm supporting a head/slider assembly flying above said rotating data recording disk, an actuating means for moving said actuator arm to move said head/slider assembly across said data recording zone and said landing zone along a radial direction of said rotating data recording disk, and an actuator lock for stopping a movement of said actuator arm to position said head/slider assembly above said landing zone, said method comprising steps of:
   detecting a termination of a read/write operation;
   responding to the termination of the read/write operation by applying a drive current for moving said actuator arm toward said actuator lock;
   continuously applying a drive current to said actuating means after engagement of said actuator arm and said actuator lock to maintain an engagement of said actuator arm with said actuator lock; and
   stopping a rotation of said rotating data recording disk.

* * * * *